(12) United States Patent
Cariffe et al.

(10) Patent No.: US 6,201,548 B1
(45) Date of Patent: Mar. 13, 2001

(54) GRAPHICAL USER INTERFACE FOR IMAGE EDITING

(75) Inventors: Alan E. Cariffe, San Diego; Anne-Marie Woodson, Lemon Grove, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/028,700

(22) Filed: Feb. 24, 1998

(51) Int. Cl.[7] .................................................. G06T 15/30
(52) U.S. Cl. ............................................................ 345/434
(58) Field of Search ................................... 345/434, 433, 345/439, 428, 432

(56) References Cited

U.S. PATENT DOCUMENTS 5,341,466 * 8/1994 Perlin et al. .......................... 345/439
5,473,740 * 12/1995 Kasson et al. ....................... 345/434

OTHER PUBLICATIONS

Corel Corporation, CorelPhoto–Paint, CorelDraw version 4.0, pp. 363–380 and 399–406, 1993.*

Screen Prints (2) of Microsoft Photo Editor "crop" function.
Screen Prints (2) of Paint Shop Pro "crop" function.

* cited by examiner

*Primary Examiner*—Jeffery Brier
*Assistant Examiner*—Motilewa Good-Johnson

(57) ABSTRACT

A region of the original image is selected and the thus-selected region is then subjected to an example image editing operation called "crop" in which the selected region remains, and the area outside of the selected region is removed. After the "crop" or editing operation has been performed, the window containing the original image is also maintained and may be viewed concurrently with the edited image. The window containing the original image is preferably automatically minimized, but may subsequently be restored to full size. If subsequent comparison by the user of both the original and "cropped" images side-by-side show an unwanted result, the "crop" operation may then be repeated on the image in the original image window. This facilitates more complex editing operations such as the selection of several portions of the original image, even overlapping regions, and the production of separate new images (or a new composite image) without changing the original, and any subsequent cropped image may be substituted for the "original", and may itself be "cropped" or otherwise edited.

6 Claims, 6 Drawing Sheets

GRAPHICAL USER INTERFACE FOR IMAGE EDITING

TECHNICAL FIELD

This invention relates generally to image processing software, and more particularly to a graphical user interface for deriving an edited image from an original image.

BACKGROUND

Software is commercially available with a graphical user interface for selecting and editing a digitally generated image in a number of ways. For example, to "cut" or delete a portion of the image, the user can use a mouse to select an area of the image by clicking the left mouse button while the screen "cursor" is located on a corner of the image that is desired to be deleted, dragging the screen "cursor" with the mouse to another corner, thereby outlining a portion or all of the image.

After selection of this region, the user then completes the "cut" by either selecting the "cut" command from a drop-down menu (using his mouse and/or a keyboard), or alternatively, by using his mouse to select and activate a graphical interface "cut" button or icon. In either case, known image editing software is invoked which performs the "cut" operation, resulting in the original image being replaced by an edited image which has a blanked-out area enclosed by the boundaries of the region so selected.

Conventional image editing software typically permits an edited image to be restored, for example, by saving the data corresponding to one or more levels of previously edited image data and providing the user with an "undo" button or icon, and/or an "undo" menu option, which then invokes software to replace the current version of the edited image with a prior version. However, when using an "undo" command to restore the original image, the user of the software cannot effectively see both of the two images simultaneously, that is, cannot see both the edited image and the original image at the same time. This leaves the user at a disadvantage, particularly when several related images are being created from the same original and/or a careful examination of the edited image reveals defects that might have been avoided if the area in question had been selected more carefully. Although the original image may subsequently be restored and re-edited, the boundary and contents of the ordinally selected region will have then disappeared, possibly resulting in several "trial and error" iterations before an optimal result has been obtained.

SUMMARY

In accordance with the present invention, there is provided an improved method for deriving an edited image from an original image.

In an exemplary editing operation (called "crop") which in some respects is analogous to the known "cut" and "crop" operations, a region of the original image is selected, for example with a moving dashed outline showing the user the region boundaries, and the thus-selected region is then subjected to a defined editing operation, for example via a menu selection or by placing a mouse-controlled screen "cursor" over a "screen-button" and depressing a button on the mouse; the selected region remains, and the area outside of the selected region is blanked out.

In contrast with the known image editing operations, after the edited image has been formed and is displayed in a new window, the window containing the original image is also maintained and may be viewed concurrently with the edited image.

Moreover, the window containing the original image is preferably automatically minimized, that is, reduced in size to what is called an "iconified" version of the original, but may subsequently be restored to full size. If subsequent comparison by the user of both the original and edited images side-by-side show an unwanted result, the editing operation may then easily be repeated on the image in the original image window, which preferably does not get modified in any way by single or multiple editing operations in sequence. This greatly facilitates more complex editing operations such as the selection of several portions of the original image, even overlapping regions, and the production of separate new images (or a new composite image) without changing the original.

DRAWINGS

Figure 4:
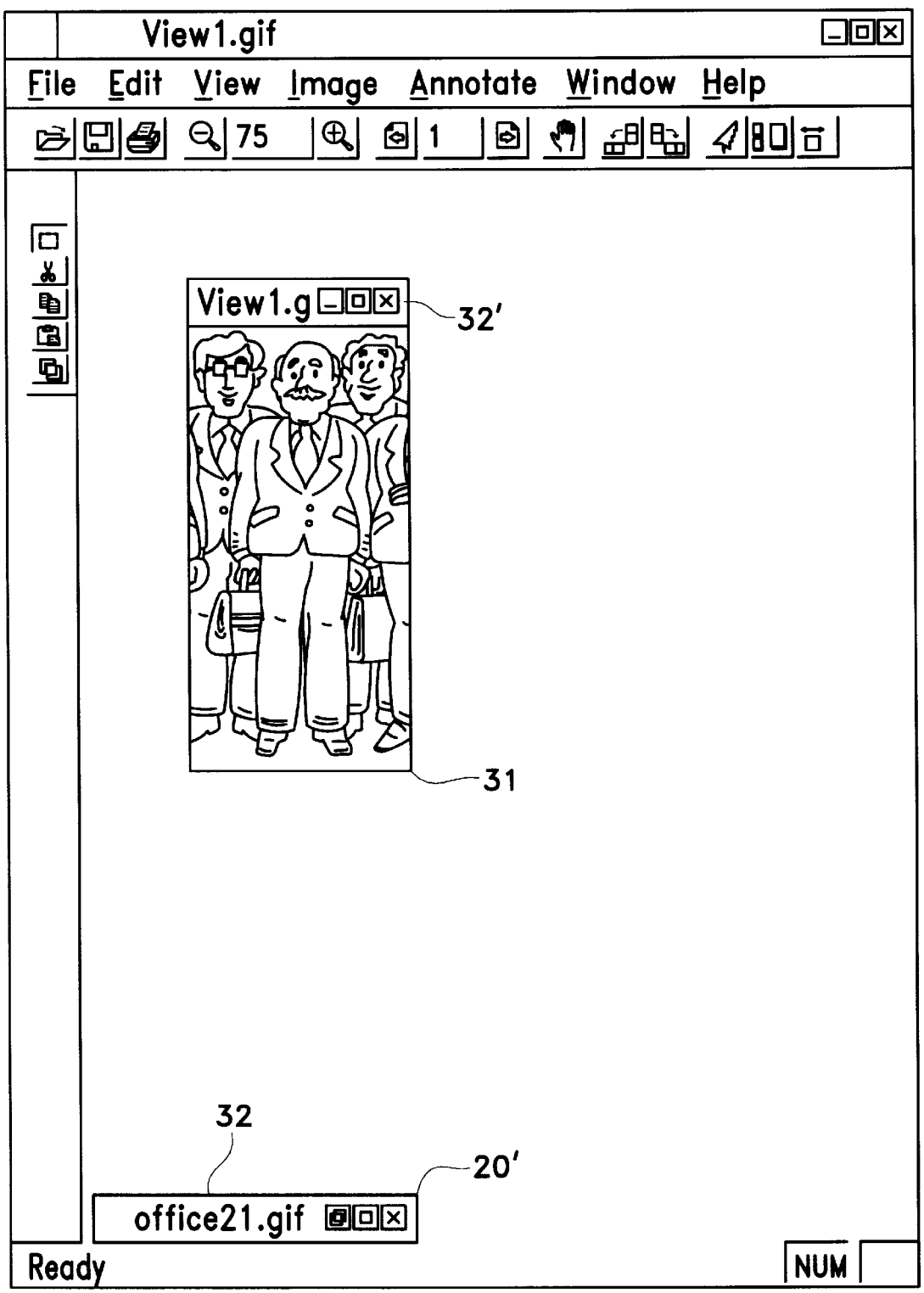
FIG. 4 shows the result of the "crop" operation of FIG. 3, with the cropped image appearing in one window and with the window containing the original image "iconified".
Figure 5:
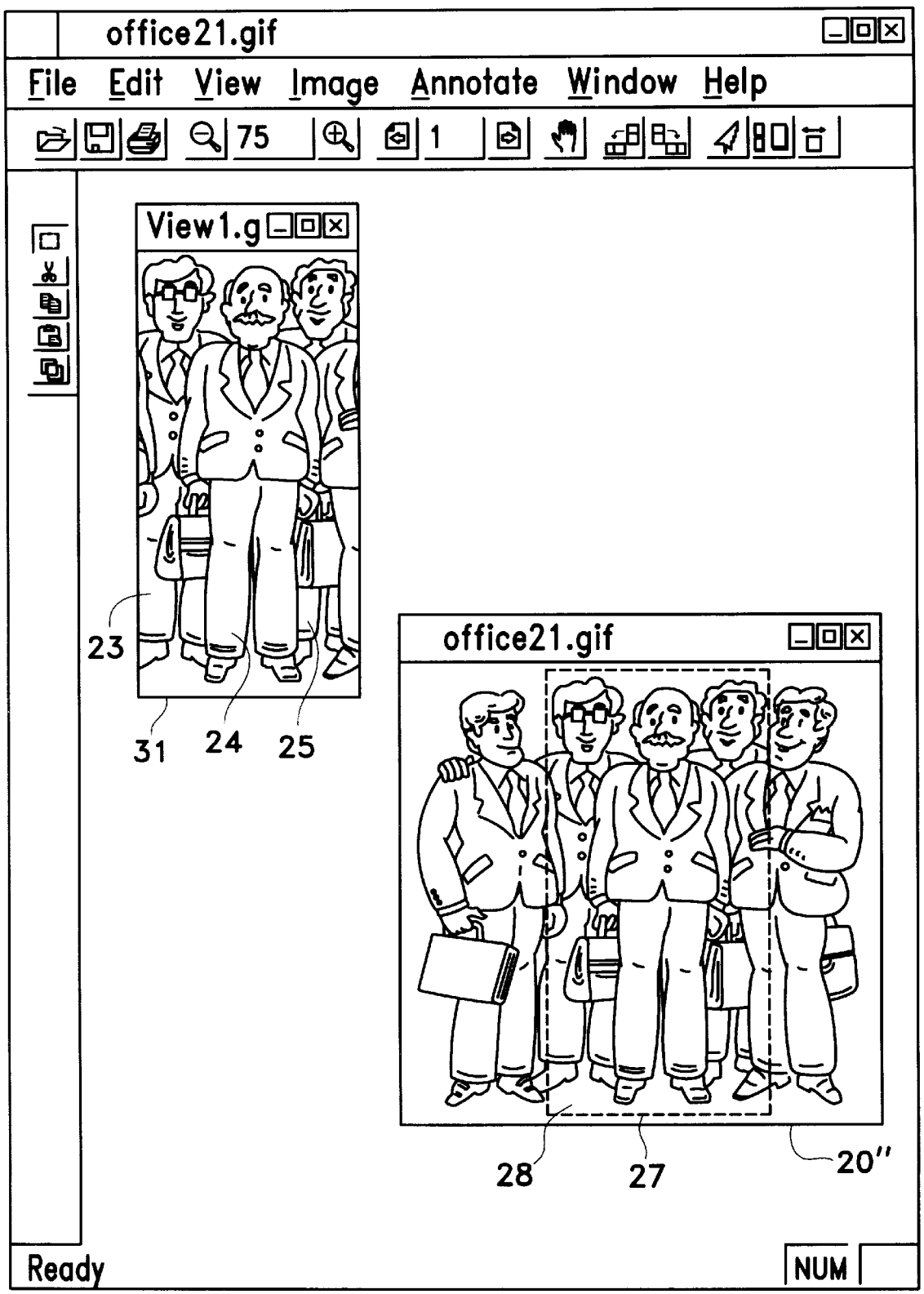

FIG. 5 corresponds generally to FIG. 4, but with the "iconified" window restored.

Figure 6:
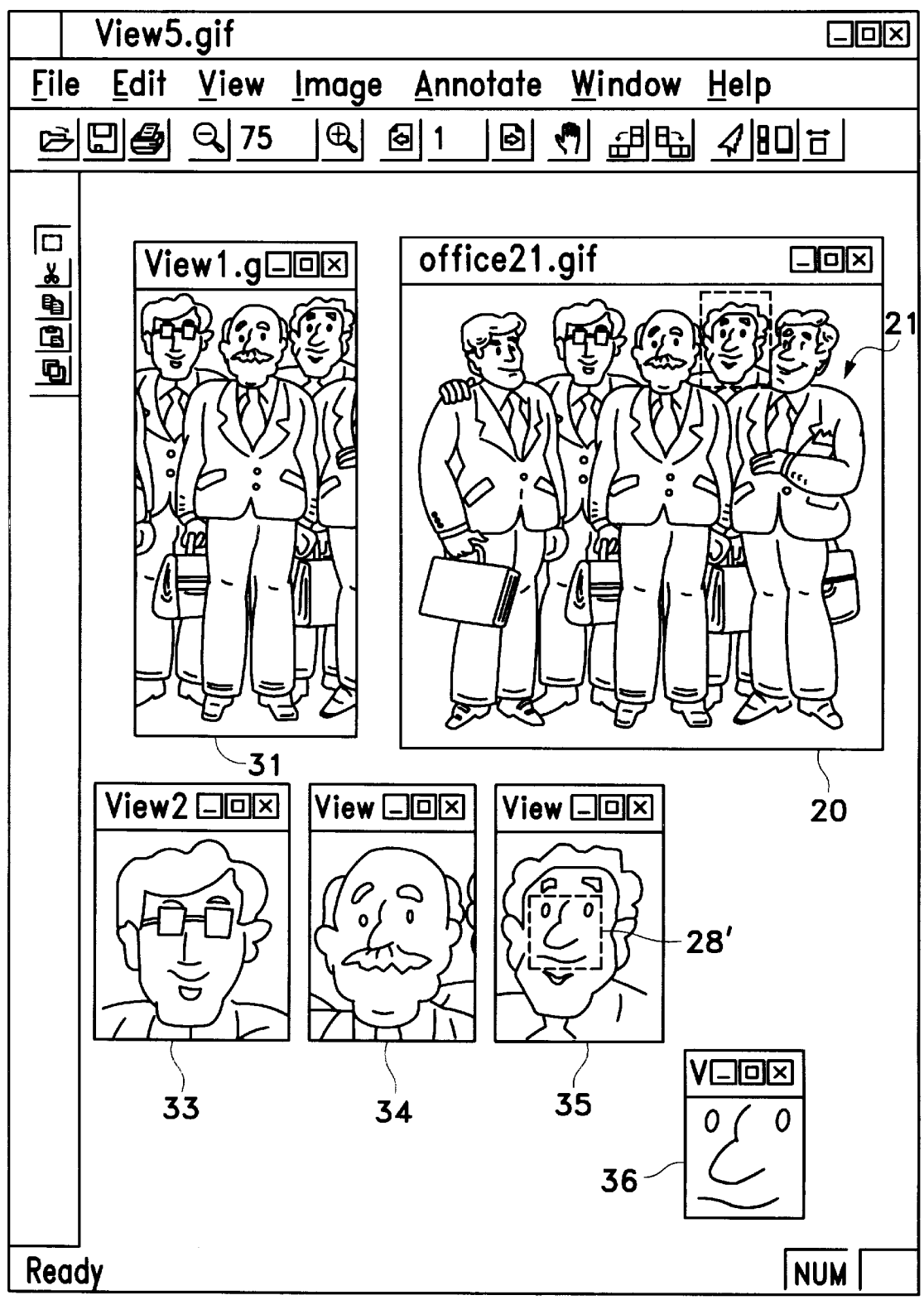

FIG. 6 shows how the original image may be further edified to provide additional "cropped" images, each in a separate window.

DETAILED DESCRIPTION

Figure 1:
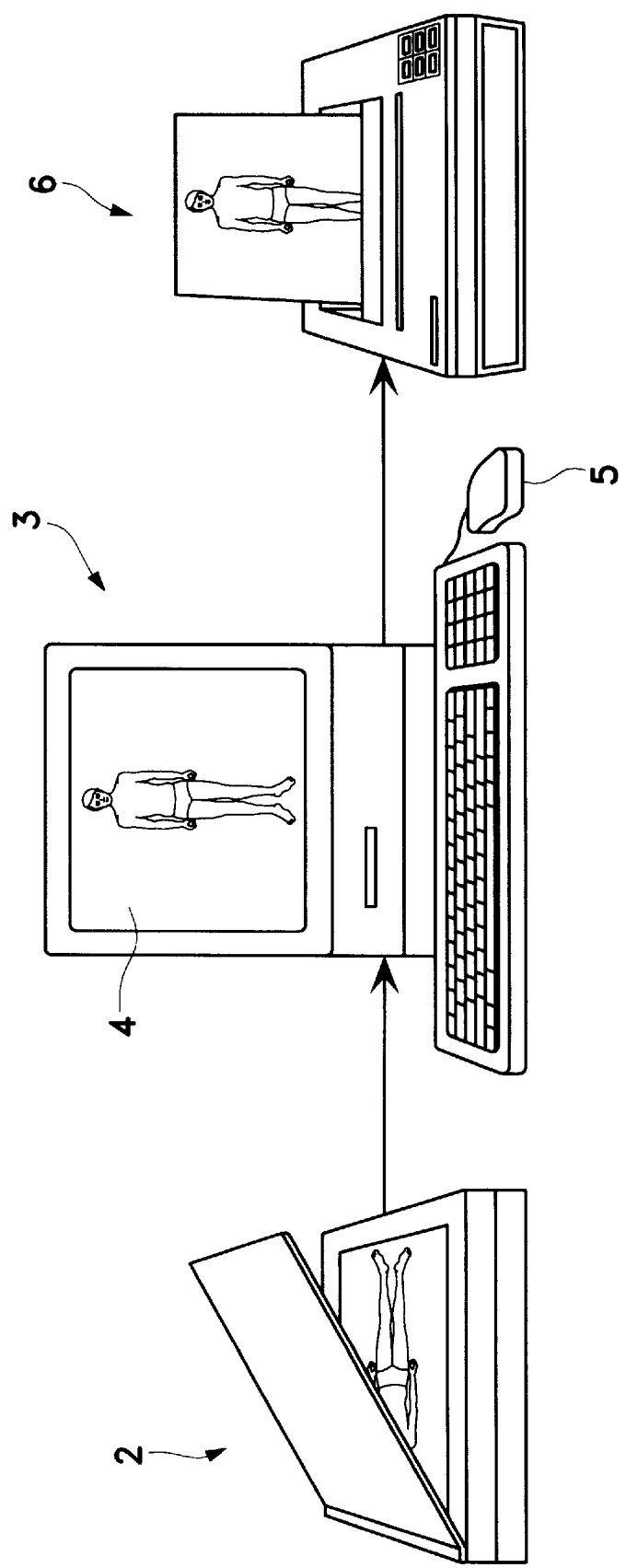
FIG. 1 is a block diagram of a typical PC-based image processing system.

Referring to FIG. 1, it will be seen that a typical PC-based image processing system 1 incorporates a scanner 2 (or other digital image source), a personal computer 3 (or other digital image processor) with a monitor 4 and mouse 5 (or other cursor positioning device), and a color ink jet printer 6 (or other output device). Except for certain aspects of the software, to be discussed in more detail hereinafter with respect to FIGS. 2–6, the image processing system may comprise commercially available hardware and software components, assembled in a manner that will be readily apparent to one skilled in the art.

Figure 2:
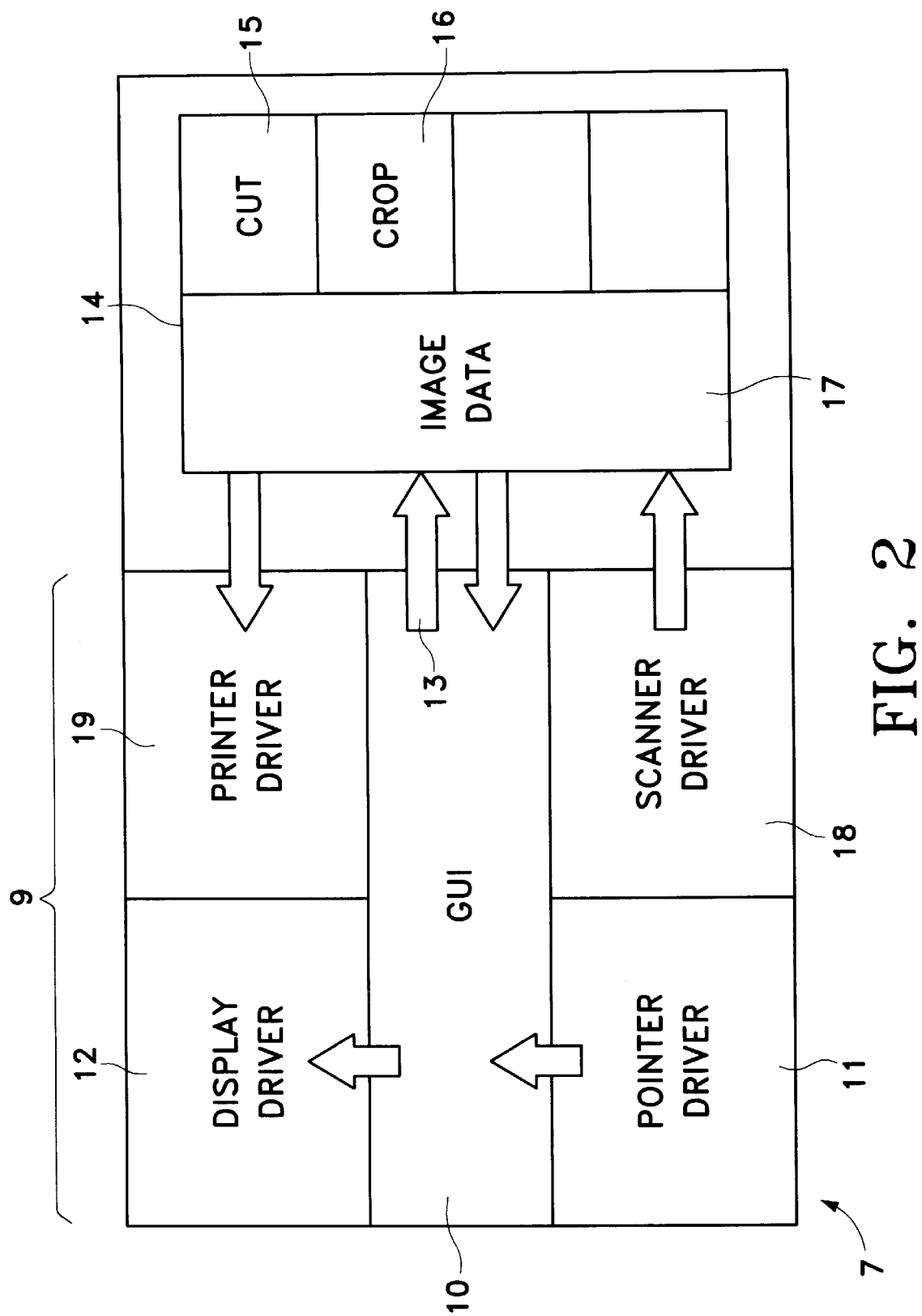
FIG. 2 is a block diagram of various routines associated with a preferred embodiment of the present invention.

In an exemplary embodiment as shown in simplified block diagram form in FIG. 2, the software 7 that controls PC 3 includes an operating system 9 (such as Microsoft Windows 95™) having a generic graphical interface 10 whereby the user may use the pointer 5 (sometimes known as a "mouse") via a pointer driver 11 to select and operate various controls (such as buttons and menus) appearing on the screen of the monitor 4 under the control of a display driver 12 thereby generating control signal inputs 13 to an application program such as image processor program 14. Image processor 14 includes editing routines for performing various imaging functions (including a "Cut" routine 15, as well as a "Crop" routine 16 to be described in greater detail hereinafter with respect to FIGS. 3–6). Image processor 14 also includes memory 17 for storing in known fashion the original image (i.e., before the current set of adjustments were applied, but including any previously saved adjustments, as well other corresponding images that incorporate various selected combinations of adjustment steps. Image processor 14 receives image data from scanner 2 via a scanner driver 18 and outputs image data not only to the monitor 4 via the graphics interface 10, but also via printer driver 19 to the printer 6.

Figure 3:
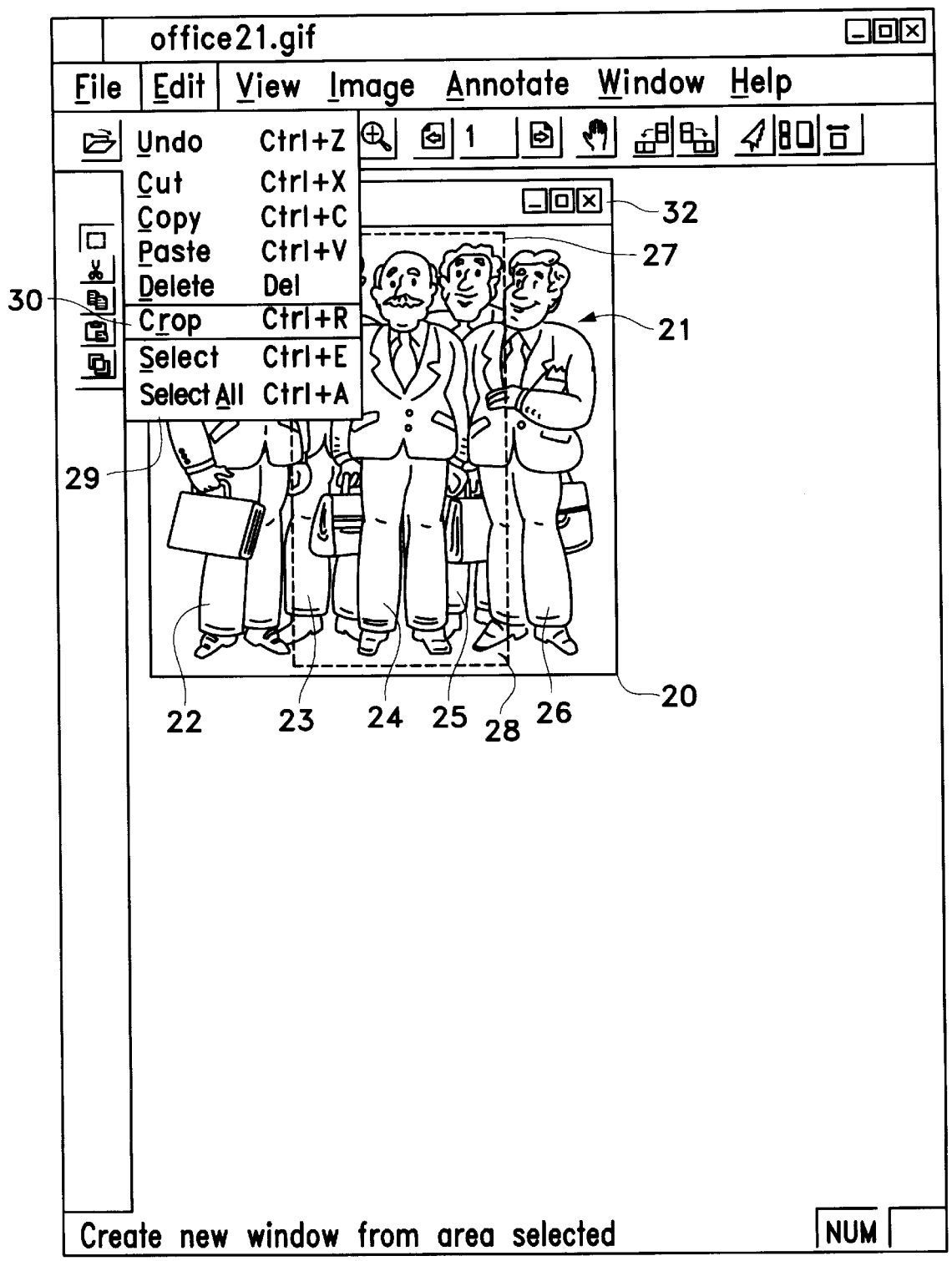
FIG. 3 shows a window containing an original image that is about to be subjected to a "crop" operation.

FIG. 3 shows a main "application window" of a graphic-based user interface (such as is utilized in the Windows 95™ operating system) displaying a window 20 containing an original image 21 in the form of a group portrait of five standing individuals 22, 23, 24, 25, 26 on which a dashed outline 27 has been placed (e.g., in conventional fashion, preferably using a mouse or graphics tablet to designate at least two opposing corners of the selected region 28), to thereby define a contemplated "crop" operation containing only the three center individuals 23, 24, 25. Also visible in FIG. 3 is a drop-down menu 29 on which a "crop" command 30 has been highlighted (e.g., in conventional fashion by means of a cursor key and/or a mouse).

As shown in FIG. 4, when crop command 30 is selected, (e.g., in conventional fashion by means of the enter key and/or the left mouse button), the cropped image (which may be formed from the original image using known software routines) appears in a new one window 31 and the window 20 containing the original image is preferably replaced by an "iconified" window 20', that is to say the window is reduced to a minimal size, but is still visible in the main application window, is still associated with the original image, and still displays in its title bar 32 at least the first few characters of the name of the file in which the data corresponding to the original image has been stored. Note that in FIG. 3, the file name ("office21.gif") in the title bar 32 of the active image window 20 is obscured by drop-down menu 29; however, since window 20 is the only image currently being displayed and is therefor the "focus" for any subsequent editing operation, its file name is also visible in the title bar of the main application window (top of FIG. 3). In FIG. 4, the "focus" is on the cropped window 31, and its file name ("View1.gif") appears in the title bar 32 of the cropped image window 31.

Reference should now be made to FIG. 5, which corresponds to the main application window of FIG. 4 with the iconized window 20' now appearing in restored form 20". Note that the dashed outline 27 is still present, so that any size or positioning errors can be corrected by appropriate manipulation and/or redrawing of the selected area 28 and a new cropped image in a new window (not shown) can be generated for side by side comparison with the first cropped image "View1.gif" 31.

FIG. 6 shows another aspect of the present invention, whereby more than one cropped image 31, 33, 34, 35 can be formed from the same original image 21 and each of the cropped images 31, 33, 34, 35 can be separately cropped and/or otherwise edited before one or more of the thus-edited images are saved. In particular, one of the cropped images 35 "view4.gif" can serve as the original image and a new selected area 28' can be used to form yet another cropped image 36 "view5.gif" (which is now the focus). It should be noted that all of the intermediate images "View1.gif" 31 "View2.gif" 33, "View3.gif" 34, and "View4.gif" 35 are depicted in FIG. 6 as normal windows. However, in accordance with the present invention they are preferably each minimized when the next cropped image is formed, and the depicted display shows the images after their respective windows have all been restored to a normal size after they had been minimized as part of the cropping process.

Other modifications will be apparent to those skilled in the art. For example, the crop operation could be replaced by another image editing function such as adjusting the color saturation of the selected area. As another example, the entire image could be the selected area.

What is claim is:

1. A graphical user interface for image editing, comprising:

a first window for displaying a digitally generated original image; and editing means for automatically opening a second window, for forming an editable digital image from the original image, and for displaying the editable digital image in the second window, wherein the original digital image remains in the first window, the first window is automatically changed from a window in which an image is visible to an iconic representation of a minimized window in which the image is no longer visible, when the editable digital image is formed, and the minimized first window may be subsequently restored while the editable digital image remains displayed in the second window.

2. The interface of claim 1, wherein a plurality of said editable images may be sequentially formed from the same original image, said original image and all of said editable images may be simultaneously displayed each in a respective said window, and each said respective window is opened as each said editable image is formed.

3. The interface of claim 1, further comprising:

selecting means for establishing a clearly delineated boundary separating the original digital image into a selected region and an unselected region, wherein the editable digital image corresponds to the selected region of the original image.

4. The interface of claim 3, wherein when the minimized first window is subsequently restored, said boundary is clearly delineated.

5. The interface of claim 3, wherein the editing means performs a crop operation in which the unselected region is outside said boundary and is removed from the original image to thereby form an edited image.

6. The interface of claim 5, wherein said edited image may be subsequently edited to form a third edited image, and all of said edited images may be simultaneously displayed each in a respective said window.

* * * * *